US006671280B1

(12) United States Patent
Bass et al.

(10) Patent No.: US 6,671,280 B1
(45) Date of Patent: Dec. 30, 2003

(54) NETWORK PROCESSOR FOR MULTIPROTOCOL DATA FLOWS

(75) Inventors: Brian Mitchell Bass, Apex, NC (US); Jean Louis Calvignac, Cary, NC (US); Anthony Matteo Gallo, Apex, NC (US); Marco C. Heddes, Raleigh, NC (US); Michael Steven Siegel, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/535,794

(22) Filed: Mar. 29, 2000

(51) Int. Cl.[7] .............................................. H04L 12/56
(52) U.S. Cl. ................. 370/395.53; 370/360; 370/401; 370/411; 370/422; 709/236
(58) Field of Search ................. 380/351, 357, 380/360, 389, 395.5, 395.53, 401, 411, 422; 709/230, 236, 246

(56) References Cited

U.S. PATENT DOCUMENTS

| | | | |
|---|---|---|---|
| 5,420,858 A | 5/1995 | Marshall et al. | 370/60.1 |
| 5,457,681 A | 10/1995 | Gaddis et al. | 370/56 |
| 5,548,731 A | 8/1996 | Chang et al. | 395/280 |
| 5,617,419 A | 4/1997 | Christensen et al. | 370/471 |
| 5,684,797 A | 11/1997 | Aznar et al. | 370/390 |
| 5,802,287 A | 9/1998 | Rostoker et al. | 395/200.8 |
| 5,815,501 A | 9/1998 | Gaddis et al. | 370/402 |
| 5,822,321 A | 10/1998 | Petersen et al. | 370/474 |
| 5,841,990 A | 11/1998 | Picazo, Jr. et al. | 395/200.79 |
| 5,889,777 A | 3/1999 | Miyao et al. | 370/345 |
| 5,946,313 A | 8/1999 | Allan et al. | 370/397 |
| 6,111,880 A * | 8/2000 | Rusu et al. | 370/395.53 |
| 6,252,878 B1 * | 6/2001 | Locklear et al. | 370/401 |
| 6,259,699 B1 * | 7/2001 | Opalka et al. | 370/398 |
| 6,266,333 B1 * | 7/2001 | Kartalopoulos | 370/395.53 |
| 6,385,171 B1 * | 5/2002 | Takase et al. | 370/235 |
| 6,426,957 B1 * | 7/2002 | Hauser et al. | 370/413 |

OTHER PUBLICATIONS

Lin A platform for seamless interworking among conventional LANs and ATM networks. Global Telecommunications Conference, 1994. GLOBECOM '94. 'Communications: The Global Bridge'., IEEE , Nov 28–Dec. 2, 1994 pp. 296–301 vol. 1.*
"Method for the Conversion of Multimedia Streams to Packet Streams", IBM Technical Disclosure Bulletin, vol. 37 No. 06A Jun. 1994, pp. 95–97.
"Gigabit Speed Multi–Protocol Chip and Adapters for Network Computing", IBM Technical Disclosure Bulletin, vol. 40 No. 10 Oct. 1997, pp. 13–15.
"Multiprocessor for Multiprotocol Router Systems", DBM Technical Disclosure Bulletin, vol. 36 No. 3 Mar. 1993, pp. 321–323.
"Forwarding Domains Across Multiple Virtual LANs", IBM Research Disclosure, Dec. 1998, pp. 1–2.

* cited by examiner

Primary Examiner—Hassan Kizou
Assistant Examiner—Dmitry Levitan
(74) Attorney, Agent, or Firm—Bracewell and Patterson

(57) ABSTRACT

A method for integrating Asynchronous Transfer Mode (ATM) and frame-based traffic flows within a telecommunications network is disclosed. The telecommunications network includes a network processor having upside processing means for delivering an incoming flow from the telecommunications network to a switch and downside processing means for delivering outgoing network traffic from the switch to the telecommunications network. The incoming flow is initially received at the upside processing means as a frame-based flow. The incoming flow may be characterized as belonging to a group having frame-based flows and ATM flows. In response to the receipt of the incoming flow, the incoming flow is determined if it is destined for a legacy, ATM-only device. The incoming flow is then processed according to the determined routing requirements and the incoming flow characterization before delivering the incoming flow to the switch.

12 Claims, 4 Drawing Sheets

FIG. 4    400

402 Cell Arrives on Egress Side
→ 404 Is it Frame Format?
 - Yes → 406 Reassemble using Frame Format info back into original frame in Data Store
 - No → 408 Hybrid Format?
   - Yes → 416 Reassemble using Hybrid Format info back into original frame in Data Store
   - No → 412 Is it ATM Format?
     - No → 410 error
     - Yes → 414 ATM Switching?
       - Yes → 418 Swap VP/VC and Send ATM cell to ATM port
       - No → 420 Reassemble using ATM Cell info back into original frame in Data Store → 422 Send frame to Destination Port(s)
→ 426 Ethernet Port?
 - Yes → 428 Send entire Frame
 - No → 424 Segment frame into ATM Cells

NETWORK PROCESSOR FOR MULTIPROTOCOL DATA FLOWS

BACKGROUND OF THE INVENTION

1. Technical Field

The present invention relates in general to improving management of communication networks and in particular to a method and system for integrating multiple data transport mechanisms within a telecommunications network. More particularly, the present invention relates to a method and system for efficiently converting and routing data units between frame-based and Asynchronous Transfer Mode (ATM) networks.

2. Description of the Related Art

Electronic data networks are increasingly utilized to accommodate divergent types of network traffic including computer data, voice, and video. Such networks enable the interconnection of vast numbers of computer workstations, telephony endstations, television systems, multimedia teleconferencing systems, and other facilities over common data links. Such systems or workstations are typically interconnected by Local-Area Networks (LANs) such as Ethernet or Token Ring. Wide-Area Networks (WANs) are utilized to construct global interconnections over metropolitan, national, or international boundaries.

LANs and WANs are interconnected by telecommunications infrastructure devices such as hubs, bridges, and routers. In accordance with Systems Network Architecture (SNA) and Open Systems Interface (OSI) telecommunications models, a "hub" is a device providing Physical Link Layer (Layer 1) interconnection among network nodes, while bridges utilize the Data Link Layer (Layer 2), and routers operate within the Network Layer (Layer 3). The Physical and Data Link connectivity provided by hubs and bridges are confined within a particular data transport "network" type (Ethernet, for example). The Network Layer connectivity provided by routers requires higher-level functionality for providing internetwork communication (converting between ATM and Ethernet protocol, for example) and also for selecting optimal routes for data packets or cells individually. Because hubs and bridges operate on data units formatted in a single protocol, routers can identity and process data which may be in one of several possible protocols. Routers are therefore often referred to as "multiprotocol" devices.

Frame-Based Technologies

A set of telecommunications standards, known as the IEEE 802 standards, have been developed by the Institute for Electrical and Electronics Engineers (IEEE) for defining methods of access and control on LANs. Ethernet is a widely utilized LAN technology for which the IEEE 802.3 standard was developed and continues to evolve. The IEEE 802.3 standard corresponds to the Physical and Data Link layers of the SNA and OSI layered-protocol models. Typically, Ethernet protocols divide the Data Link layer into two sublayers: a logic link control (LLC) sublayer, and a media access control (MAC) sublayer. The LLC sublayer facilitates station-to-station connections, control message exchanges, and error control. The MAC sublayer addresses network access and collision detection and may vary among different IEEE 802 standards.

As utilized herein, a "frame" refers to a variable-length packet of information transmitted as a single unit within a LAN. Each frame follows the same basic format and organization. Along with a data field "payload," a frame includes control information fields for address verification, error checking, synchronization, etc. Ethernet frame encapsulation is well known in the art as a technique whereby a message or a data packet that is constructed in accordance with a higher level protocol, such as Internet Protocol (IP), can be subsumed as an undifferentiated stream of bits that is packaged in accordance with a lower protocol level data unit, such as an Ethernet frame. Variable data packet size is a characteristic of frame-based technologies such as Ethernet.

Asynchronous Transfer Mode (ATM)

ATM is a rapidly developing network technology capable of providing real-time transmission of data, video, and voice traffic. ATM is connection-oriented and utilizes cell-switching technology that offers high speed and low latency required for the support of real-time data, voice, and video traffic. Cell-switched networks, such as ATM, utilize a fixed-length data packet known as a "cell." An ATM cell is typically 53 bytes in length, five of which are virtual routing information and the other 48 of which are data.

ATM serves a broad range of applications very efficiently by allowing an appropriate Quality of Service (QoS) to be specified for differing applications. Various service categories have been developed to help characterize network traffic including: Constant Bit Rate (CBR), Variable Bit Rate (VBR), Unspecified Bit Rate (UBR), and Available Bit Rate (ABR). In addition, ATM provides for the automatic and guaranteed assignment of bandwidth to meet the specific needs of applications, making it ideally suited for supporting multimedia as well as for interconnecting LANs. Due to its inherent speed and switching efficiency characteristics, ATM is increasingly utilized as a backbone network for connecting frame-based LANs.

Multiprotocol Networking

In response to ever-increasing support needs of communications networks which are growing in terms of geographic dispersion and complexity, the functionality of several network infrastructure devices including hubs, bridges, and routers are increasingly integrated within a single device referred to hereinafter as a "network processor." Such network processors may include means for integrating several different types of data transport mechanisms (referred to hereinafter as "transport protocols") such as the frame-based data flows utilized in Ethernet technologies and fixed-length cell flows utilized in ATM. As multiprotocol switched networks become more prevalent, there is a corresponding need for a network processor in which differing data transport mechanisms can be integrated with minimal processing and data storage overhead.

The ability to integrate these differing protocols in a network processor provides the potential for greater flexibility and scalability within telecommunications networks, but also presents traffic management problems. The data throughput speed of a network processor is substantially reduced when the network processor must convert flows between differing transport protocols (Ethernet frames to ATM cells, for example) in addition to directing internetwork traffic within a LAN or WAN. Conventional network processors require substantial internal buffer storage capacity and additional data processing overhead in order to address protocol conversion problems which are particularly acute when frame-based data flows are combined with high-speed cell-switched ATM flows. Unable to maintain "wirespeed," such conventional network processors may thus become a network traffic bottleneck.

One approach to accommodate the high throughput requirements of frame-to-cell conversion within a centralized network processing device is to convert all incoming traffic into ATM cell format. This solution requires additional processing overhead for converting and reconverting non-ATM traffic. For ATM-to-frame conversion, ATM cells are typically collected and assembled into Ethernet frames prior to switching. Incoming or "upside" ATM ports may be simultaneously receiving several thousand flows, each comprising cells that may arrive at the upside port at unpredictable and widely varying time intervals. Conventional data routing devices have therefore required large ingress or "upside" data storage capacity to provide adequate collection and assembly point for ATM-cell-to-Ethernet-frame conversion.

In order to enhance the practicability and quality of multiprotocol telecommunications networks, it would be desirable to provide an efficient method and system for integrating ATM and Ethernet flows within a network processor device whereby upside memory and overhead processing requirements are minimized.

SUMMARY OF THE INVENTION

A method and system are disclosed for integrating ATM and frame-based traffic flows within a telecommunications network that includes a network processor having upside processing means for delivering an incoming flow from the telecommunications network to a switch, and downside processing means for delivering outgoing network traffic from the switch to the telecommunications network. An incoming flow is received by the upside processing means, wherein the incoming flow may be characterized as either a frame-based flow or an ATM flow. An upside ATM router determines whether an incoming ATM flow terminates or is switched within the network processor. In response to determining that the incoming ATM cell flow is to be switched within the network processor, the upside processing means delivers the flow to the downside processing means in ATM cell format. In response to determining that the incoming ATM flow terminates within the network processor, the ATM router delivers the incoming ATM flow to a hybrid assembly device. The hybrid assembly device assembles the first few ATM cells into a hybrid frame-based format which is delivered across the switch fabric to a downside frame assembly device. Later arriving cells of the same flow are tagged and delivered across the switch to the downside processing means where they are assembled with the hybrid frame into a completed frame. An incoming frame-based flow is delivered across the switch to the downside processing means in frame format before segmentation is performed on ATM-bound frames.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 4 is a high-level logic diagram illustrating steps performed during downside data flow processing within the network processing infrastructure of FIG. 1.

DETAILED DESCRIPTION OF THE PREFERRED EMBODIMENT

The method and system of the present invention provide network processing functionality between frame-based networks such as Ethernet, Token Ring, etc., and high-speed, cell-switched networks such as ATM. A network processor is disclosed herein that provides unique queueing and scheduling features for facilitating bridging and routing between Ethernet of various speeds and ATM cell transport. As illustrated in the figures described in further detail below, the architecture of such a network processor includes incoming, or "upside," functionality for receiving and processing incoming multiprotocol traffic. Downside network processing functionality is provided for final processing prior to delivery from the network processor. It should be noted that although "network processor" is utilized in reference to the overall inventive concept described herein, many unique features of the present invention are embodied within sub-parts of the network processor described herein. As described in further detail with reference to the following figures, the method and system of the present invention support both Ethernet and ATM flows and supports both upside and downside reassembly and routing to provide an optimum balance between traffic handling capacity and cost.

Figure 1:
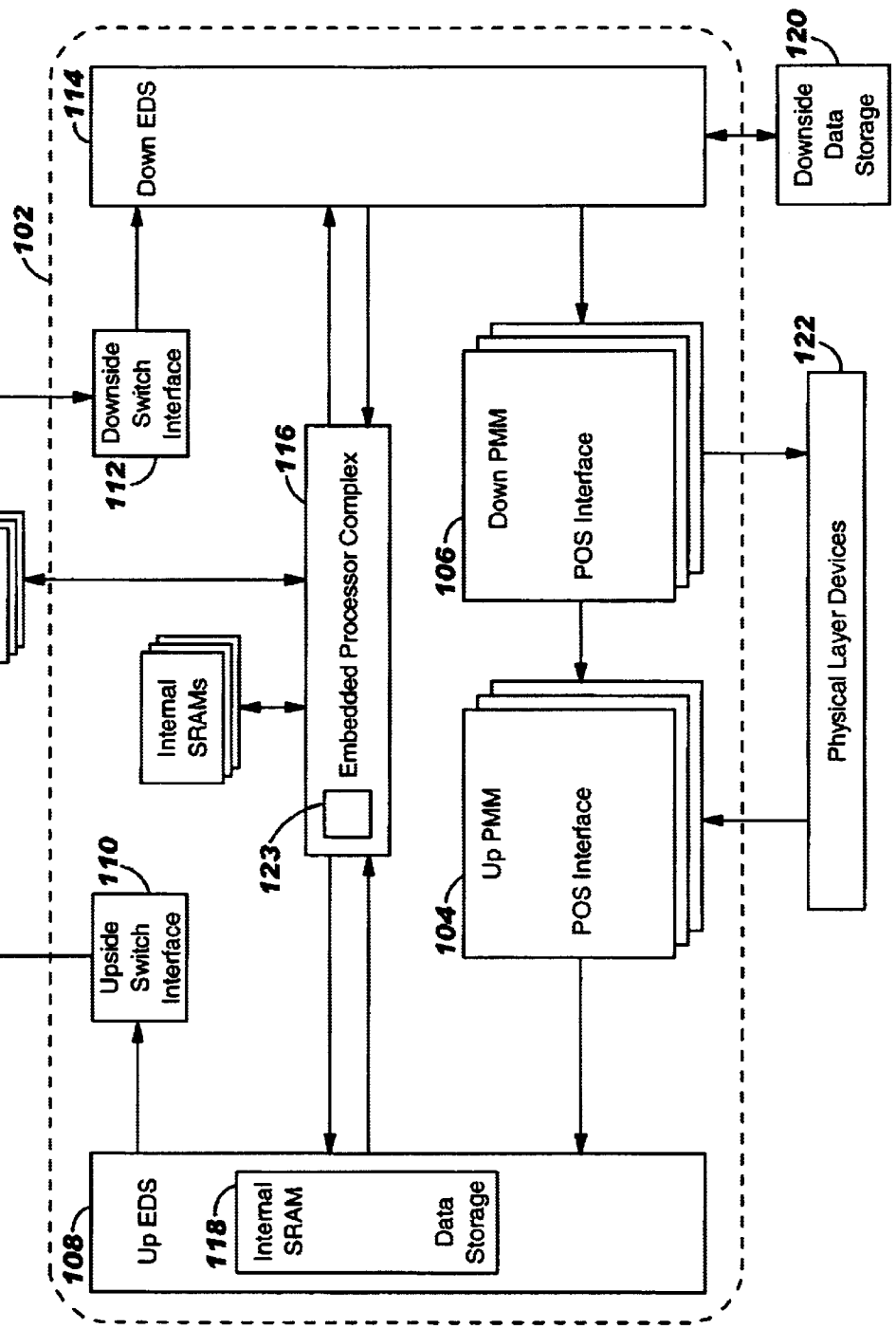
FIG. 1 is a high-level block diagram illustrating a network processing infrastructure in accordance with a preferred embodiment of the present invention.

Referring now to the figures, wherein like reference numerals refer to like and corresponding parts throughout, and in particular with reference to FIG. 1, there is depicted a high-level block diagram illustrating a network processing infrastructure 100 assembled in accordance with a preferred embodiment of the present invention. As illustrated in FIG. 1, network processing infrastructure 100 includes a network processor 102 and physical layer devices 122.

As illustrated in FIG. 1, network processor 102 includes an upside physical MAC multiplexer (PMM) 104 and a downside PMM 106, each of which integrate at least one media interface macro. Example of such media interface macros includes Packet-Over-SONET (POS) Interface. Each of the media interface macros within upside PMM 104 and downside PMM 106 can be individually configured to support different incoming network traffic including 100 Mbps Ethernet ports, Gigabit Ethernet ports, POS ports, etc.

In the depicted embodiment, upside PMM 104 receives Ethernet frames and ATM cells from external device interface 122. Downside PMM 106 transmits the processed downside frames and cells to external device interface 122. It should be noted that upside and downside network processing functionality illustrated within network processor 102 are not necessarily co-located within a single chip. Multiple input/output (I/O) interfaces to and from a switch fabric (not depicted) may be utilized to connect multiple network processors to the same routing switch.

Network processor 102 comprises an embedded processor complex (EPC) 116 communicating with an upside enqueue/dequeue/scheduler (EDS) 108 and a downside EDS 114. EPC 116 includes protocol processors 123 for converting between different transport protocol mechanisms (converting Ethernet frames into ATM cells, for example). EPC 116 further includes a 3-stage pipeline (fetch, decode, and execute), general purpose registers, special purpose registers, cache memory, Arithmetic Logic Unit (ALU), and hardware assist coprocessors.

Upside EDS 108 provides internal data queues on the "ingress" or "upside" of network processor 102 to allow several media ports to receive frames or cells simultaneously. The data within these incoming flows are temporarily stored within a data storage device 118 while the data packet header information is processed within EPC 116. In the depicted embodiment, data storage device 118 is a storage buffer commonly utilized within network devices for temporary storage of network data.

EPC 116 determines the destination of a data unit by comparing header address information with a routing or bridging look-up table. The resulting bridging or routing information is utilized by upside EDS 108 and an upside switch interface 110 to deliver the incoming data units (frames or cells) to the correct input ports within switch fabric 105. The data units are switched within switch fabric 105 in accordance with the bridging or routing requirements determined within EPC 116. Upside EDS 108 also performs queue management and interacts with upside switch interface 110 to segment frames into "switch cells" (not to be confused with ATM cells). Such frame are "cut-through" on the upside side of network processor 102, meaning the beginning of a frame can be delivered from upside EDS 108 to switch fabric 105 before the end of the frame has been received at upside EDS 108.

Upon receipt of a frame at the upside of network processor 102, upside processing intelligence within EPC 116 determines the required bridging or routing (including protocol conversion) requirements for the frame. This determination is typically performed in accordance with an assessment of frame header information. In accordance with the bridging or routing determination, the frame is delivered from the upside to the downside of network processor 102 in frame format unless, as described in further detail with reference to FIG. 2, EPC 116 determines that the frame is bound for a legacy, ATM-only device.

Upon receipt of an ATM flow, the upside processing intelligence within EPC 116 determines whether the flow will be switched or terminated (converted into frame format). If switched, the cells within the flow are forwarded to the switch fabric and delivered to downside EDS 114 for downside reassembly and possible multicast to ATM and Ethernet destinations. If the ATM connection is being terminated, the first few ATM cells are assembled into a hybrid frame format within the upside processing intelligence of EPC 116. The upside processor intelligence within EPC 116 and upside EDS 108 routes this assembled hybrid format frame in accordance with routing requirements obtained from the original cells. The upside processor intelligence within upside EDS 108 and EPC 116 designates the remaining ATM cells within the flow as belonging to the assembled hybrid format frame and delivers the designated cells utilizing a special header. The remaining assemblies for the flow are performed at the downside of network processor 102 which has substantially greater data storage capacity (within downside storage device 120) than that of upside storage device 118.

From upside data storage 118, an incoming frame flow is delivered to a suite of protocol processor 123 which determine downside routing requirements in accordance with frame header information. To determine these downside routing requirements, protocol processor 123 obtains the destination address and other similar frame routing information in order to determine which physical port on the downside of network processor 102 to which the frame is delivered. The downside routing requirements determined by protocol processors 123 enable appropriate transport protocol conversion for the data flow as it travels from the upside to the downside of network processor 102. As described in further detail with reference to FIGS. 2, 3 and 4, protocol processor 123 assists in conversion of these upside data flows in accordance with the determined transport protocol requirements.

Downside EDS 114 supports reassembly of data units received in one of three possible formats from switch fabric 105. A downside switch interface 112 receives such downside traffic from switch fabric 105. Data units within each downside flow are processed within EPC 116 and downside EDS 114 in accordance with the principles set forth in detail with reference to the downside data flow processing method illustrated in FIG. 4. When a frame is received on the downside of network processor 102 from switch fabric 105, downside EDS 114 delivers the frame header to EPC 116 for processing. EPC 116 enqueues the frame to one of the target port queues for transmission from downside PMM 106. Downside EDS 114 performs the queue management for frame reassembly and transmission. A downside data storage buffer 120 provides adequate storage capacity required for ATM-to-Ethernet frame reassembly.

Figure 2:
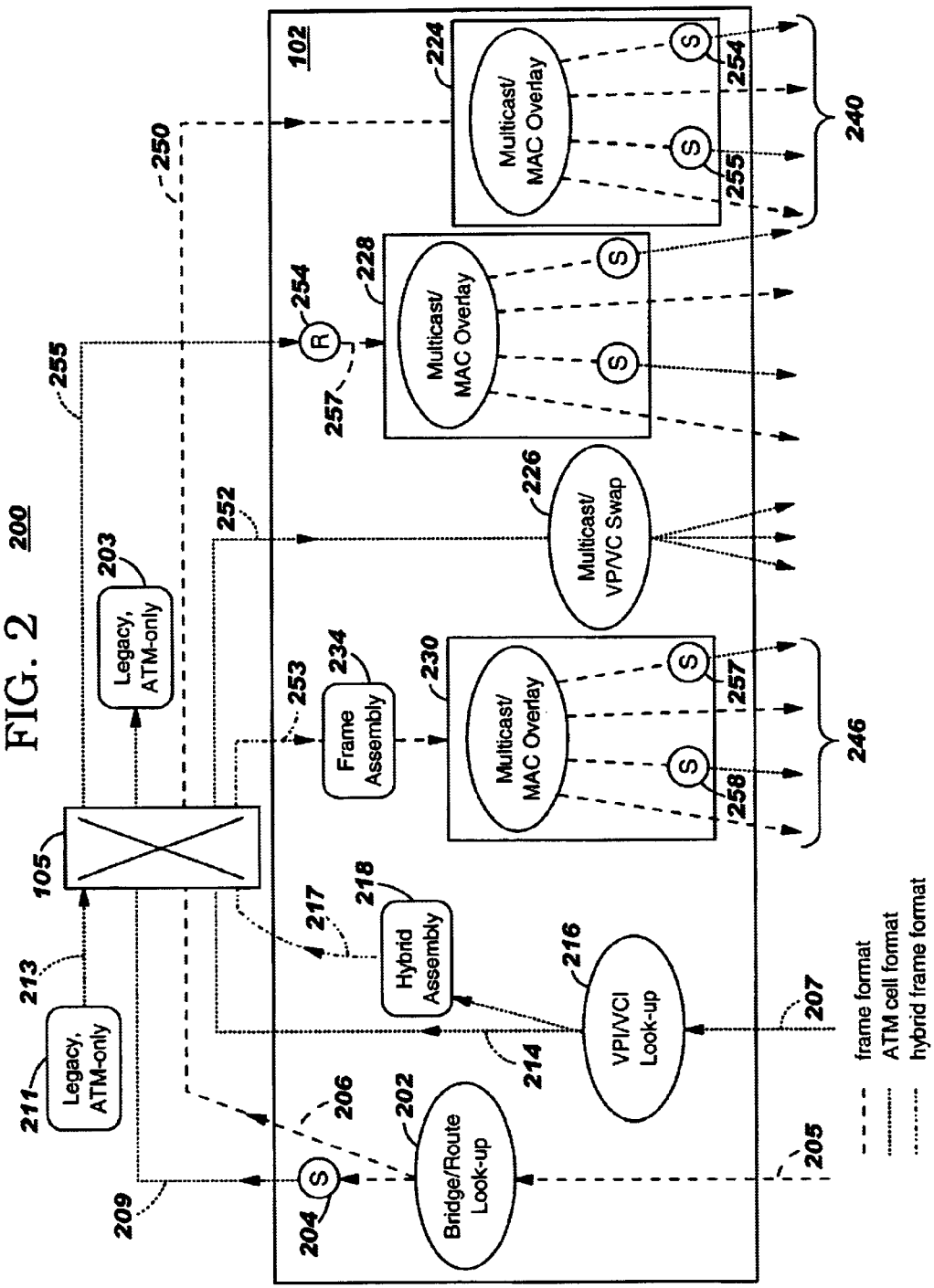
FIG. 2 is a simplified schematic representation of multiprotocol data flows as received and processed within the network processing infrastructure of FIG. 1.

Turning now to FIG. 2, there is depicted a simplified schematic representation of network processor 102 in which data flows 200 are received and processed in accordance with a preferred embodiment of the present invention. As shown in FIG. 2, each of data flows 200 include an "upside" flow, such as upside Ethernet flow 206, upside ATM flow 214, and upside hybrid flow 217. Data flows 200 also include downside Ethernet flow 250, downside ATM flow 252, and downside hybrid flow 253. As utilized herein, an "upside flow" refers to the portion of an incoming flow from its reception at a dedicated port (ATM or Ethernet) within network processor 102 to the point it is switched within switch fabric, 105. This upside flow is processed within upside intelligence and storage devices as described with reference to FIG. 1 and is then delivered from switch fabric 105 to the "downside portion" of the flow which extends from the output of switch fabric 105 into the downside processing and storage functionality of network processor 102. It should be noted that the functionality described in association with downside flows 250, 252 and 253 is not necessarily co-located on the same physical device (chip) as the functionality relating to upside flows 206, 214, and 217.

As depicted in FIG. 2, upside flows 206 and 209 originate as incoming frame flow 205, and upside flows 214, and 217 originate as incoming ATM flow 207. As further illustrated in FIG. 2, incoming frame flow 205 is processed within an upside routing/bridging device 202 that is included within the functionality of upside EDS 108 and EPC 116. Within upside routing/bridging device 202, an incoming frame is routed in accordance with one key criterion in addition to standard Layer 2 and 3 processing. This criterion is whether the frame is destined for a legacy ATM-only device 203. In response to a determination by EPC 116 that an incoming frame is to be routed to legacy, ATM-only device 203, the frame is delivered to an upside segmentation device 204. Upside segmentation device 204 segments the frame into an upside ATM cell flow 209 prior to switching. Upside segmentation device 204 is included within the functionality of upside EDS 108. Methods of segmenting frames into ATM cells such are known in the art. For further details regarding frame-to-ATM cell conversion see IBM Technical Disclosure Bulletin Vol. 40, No. 10, October 1997 and U.S. Pat. No. 5,517,419 (Christensen et al.) the pertinence of which is incorporated herein by reference. Such frame-to-ATM cell transport protocol conversion is performed within upside switch interface 110.

As described in further detail herein, the segmentation of all other ATM-bound frames is delayed until just prior to delivery from output ATM ports. Such delayed frame-to-cell conversion is performed on the downside of network processor 102 but may not be possible for legacy ATM devices. In the depicted embodiment, frame "cut-through" may be utilized whereby upside bridging/routing device 202 delivers the beginning of each frame to switch fabric 105 before the end of the frame has been received by routing device 202. Although not depicted in FIG. 2, each frame within such routed frame flows may be segmented and encapsulated within specialized "switch cells" that are amenable to the particular transport requirements of switch fabric 105.

As illustrated in FIG. 2, network processor 102 further includes downside frame flow 250 comprising frames from switch fabric 105 received from upside frame flow 206. It should be noted that downside frame flow 250 may be segmented into switch cells in accordance with switch transport requirements. The frames within downside frame flow 250 are reassembled and transmitted from appropriate output ports 240 in accordance with multicasting requirements as determined within a downside frame processor 224. "Multicasting" is well-known in the art as a data transmission process in which a data unit is delivered simultaneously to more than one network destination. Downside frame processor 224 (included within the functionality of EPC 116 and downside EDS 114), increases switching bandwidth by eliminating the need for switch fabric 105 to generate multiple copies of a multicast frame. In accordance with determined multicasting requirements, downside frame processor 224 also performs Media Access Control (MAC) overlay on multicast frames.

In an important feature of network processor 102, all incoming frame traffic (with the exception of traffic destined for legacy, ATM-only device 203) is pre-processed (within bridging/routing device 202) and switched (within switch fabric 105) prior to segmentation of ATM-bound frames into ATM cells within downside frame processor 224. In the depicted embodiment, a determination of whether frame-to-cell conversion is required is made within downside frame processor 224. Frames destined for an ATM port are segmented and converted into ATM cells within segmentation devices 254 and/or 255 which are incorporated within the functionality of downside EDS 114.

Returning to the upside of network processor 102, incoming ATM flow 207 enters an input ATM port (not depicted) and is delivered to an upside ATM router 216 which may be incorporated within EPC 116. ATM cells are received and processed within upside ATM router 216. Upside ATM router 216 performs a Virtual Port/Virtual Circuit (VP/VC) lookup to assess routing information from cell header information. Included within such routing information assessment is a determination of whether an incoming ATM flow is merely being switched to an alternate ATM link, or whether the ATM flow is terminating to a frame-based network within network processor 102. If the routing information determined by upside ATM router 216 indicates that the ATM flow will be switched rather than terminated, incoming ATM flow 207 is delivered to switch fabric 105 as upside ATM flow 214.

As further shown in FIG. 2, a legacy, ATM-only device 211 serves as an alternate source of ATM flows into switch fabric 105. An incoming flow 213 from legacy, ATM-only device 211 is delivered from switch fabric 105 as a downside ATM flow 255 into a frame assembly device 259. Downside ATM flow 255 is converted into frames comprising a frame flow 257 and delivered to a downside frame processor 228 which processes frame flow 257 in the same manner as downside frame processor processes downside frame flow 250.

In an important feature of network processor 102, an upside hybrid assembly device 218 provides means for advantageously utilizing the above-mentioned "switching versus terminating" distinction, such that upside storage capacity requirements for network processor 102 are minimized. If the routing information obtained within ATM router 216 requires that incoming ATM flow 207 be terminated (converted into a frame-based flow), incoming ATM flow 207 is delivered to upside hybrid assembly device 218 wherein a partial cell-to-frame conversion is performed. In accordance with one embodiment of the present invention, this partial reassembly includes assembling a few (one or two) ATM cells into frame format (Ethernet, for example) that can be routed by hybrid assembly device 218. In the embodiment depicted, hybrid assembly device 218 is included within the functionality of EPC 116.

Resultant upside hybrid frames are delivered to switch fabric 105 as upside hybrid flow 217. Later arriving ATM cells associated with a particular hybrid frame delivered from hybrid assembly device 218, are then tagged within hybrid assembly device 218 and incorporated into flow 217 as related to the original hybrid format frame. Assembly of these later-arriving ATM cells with the original hybrid frame, is performed within a frame assembly device 234 which is incorporated within the functionality of downside EDS 114. After downside assembly within frame assembly device 234, a frame is delivered to a downside frame processor 230 which performs multicast and MAC overlay functions on the frame similar to those performed by downside frame processor 224. It should be noted that output ports 246 from downside frame processor 230 include ATM ports having segmentation devices 257 and 258.

Figure 3:
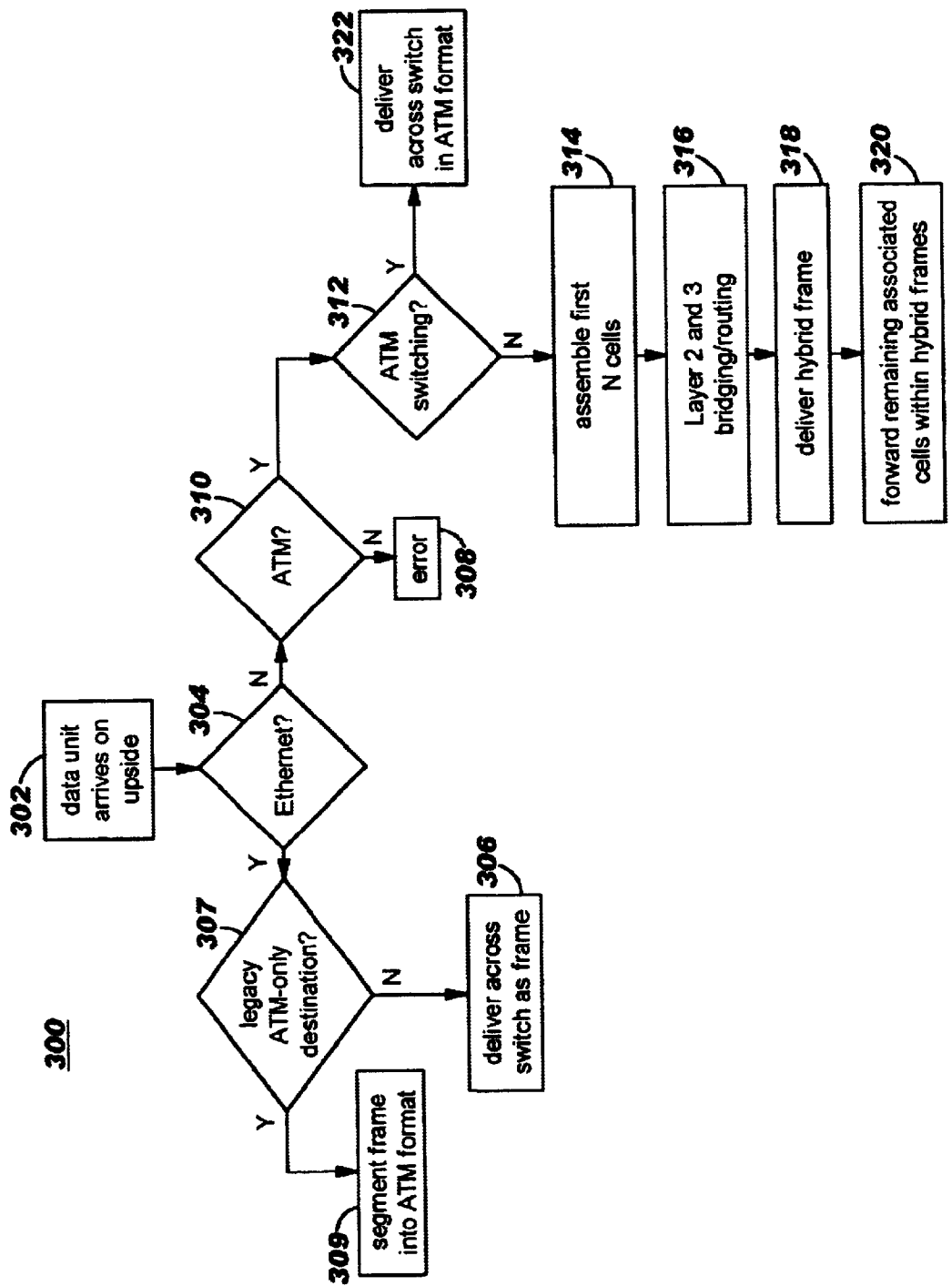
FIG. 3 is a high-level logic diagram illustrating steps performed during upside data flow processing within the network processing infrastructure of FIG. 1.

With reference now to FIGS. 3 and 4, a data flow processing method is illustrated in which upside and downside network processor resources are strategically utilized to efficiently integrate mixed protocol data flows within network processing infrastructure 100. FIG. 3 is a high-level logic diagram illustrating steps performed during upside flow processing within network processor 102 in accordance with one embodiment of the present invention. As depicted at step 302, upside flow processing commences when a data unit arrives at the upside of network processor 102. Inquiry step 304 illustrates a determination of whether the received data unit is an Ethernet frame. If so, a EPC 116 determines whether the downside destination is legacy, ATM device 203 which is not capable of receiving frames (step 307). If the incoming frame is destined for a legacy, ATM-only device, the frame is segmented within upside segmentation device 204 as illustrated at step 309.

Step 306 depicts delivery of the frame across switch fabric 105 in its original frame format where it is processed in accordance with the method depicted in FIG. 4. If the received data unit can neither be identified as Ethernet nor ATM, network processor 102 posts an error (step 308).

If the incoming data unit is an ATM cell, a further inquiry is made, as shown at step 312, to determine whether the ATM flow is being switched or terminated within network processor 102. Step 322 depicts delivery of the incoming data unit in ATM cell format to switch fabric 105 in response to a determination by upside ATM router 216 that the flow (incoming ATM flow 207) will be switched. If, as illustrated at step 314, the incoming ATM flow terminates within network processor 102, the first few ATM cells (typically one or two) are assembled into a hybrid frame. Proceeding to step 316 this hybrid frame is bridged or routed across switch fabric 105 based on the Layer 2 or 3 protocol information originally retrieved from the original ATM cell data unit as it was processed within the network processor upside. Finally, as illustrated at steps 318 and 320, the partially assembled frame is delivered across the switch fabric and the ensuing ATM cells comprising the same flow are forwarded to the switch fabric utilizing the hybrid frame format.

Turning now to FIG. 4, a high-level logic diagram illustrates steps performed during downside data flow processing within network processor 102 in accordance with one embodiment of the present invention. Downside flow processing commences when a switch "cell" containing a data unit having one of three formats is received on the network processor downside as illustrated at step 402. If the cell comprises a frame format data unit, the original frame is reassembled and delivered to appropriate destination ports at shown at steps 406 and 422. As depicted at inquiry step 426 and step 428, if it is determined that the outgoing downside frame flow will be delivered to an external Ethernet port, the entire frame is delivered without any segmentation necessary. If, as illustrated at steps 426 and 424, the external destination of the outgoing downside flow is an ATM port, the frame is segmented within downside EDS 114. Inquiry step 426 is repeated for each output port to which the frame will be multicast.

Returning to inquiry step 404, if the incoming upside flow is not a frame flow, a further assessment is performed (step 412) to determine if the flow is in ATM cell format. Having determined at step 412 that the upside flow has been delivered across the switch fabric as an ATM format downside flow, and further determining at inquiry step 414 that the ATM flow will be switched within network processor 102, a Virtual Port VP/VC swap is performed to deliver the ATM cell flow to the appropriate ATM ports (step 418). If the ATM flow is terminated within network processor 102, an Ethernet frame is reassembled and delivered to the appropriate destination ports as shown at steps 420 and 422.

In accordance with the depicted embodiment, the downside flow arriving from switch fabric 105 may be received in a hybrid format in which a partial frame has been constructed utilizing one or two ATM cells. If this hybrid format is detected, as shown at steps 408, 416, and 422, the ATM cell-to-Ethernet frame reassembly is completed by frame assembly device 234 on the downside of network processor 102 and delivered to the appropriate destination ports 246.

It is important to note that, while the present invention has been, and will continue to be, described in the context of telecommunications networking infrastructure, those skilled in the art will appreciate that the present invention is capable of being implemented as a program product in a variety of forms, and that the present invention applies equally regardless of the particular type of signal-bearing media utilized to actually carry out the implementation. Examples of signal-bearing media include: recordable-type media, such as floppy disks, hard disk drives, and CD ROMs, and transmission-type media such as digital and analog communication links.

Preferred implementations of the invention include implementations as a computer system programmed to execute the method or methods described herein, and as a program product. According to the computer system implementation, sets of instructions for executing the method and methods are resident in RAM of one or more computer systems configured generally as described above. Until required by the computer system, the set of instructions may be stored as a computer-program product in another computer memory, for example, in a disk drive (which may include a removable memory such as an optical disk or floppy disk for eventual utilization in disk drive).

While the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

What is claimed is:

1. A method for integrating Asynchronous Transfer Mode (ATM) and frame-based traffic flows within a telecommunications network that includes a network processor having upside processing means for delivering an incoming flow from said telecommunications network to a switch and downside processing means for delivering outgoing network traffic from said switch to said telecommunications network, said method comprising:

receiving said incoming flow at said upside processing means as a frame-based flow, wherein said incoming flow may be characterized as belonging to a group having frame-based flows and ATM flows;

determining said incoming flow is destined for a legacy, ATM-only device in response to said receiving step; and processing said incoming flow in accordance with said determined destination requirements and said incoming flow characterization prior to delivering said incoming flow to said switch.

2. The method of claim 1, wherein said method further comprising:

segmenting said incoming flow into an upside ATM format flow in response to a determination that said incoming flow is destined for a legacy, ATM-only device; and delivering said upside ATM format flow to said switch in ATM format.

3. The method of claim 1, wherein said method further comprising:

delivering said incoming flow to said switch as an upside frame-based flow in response to determining that said incoming flow is not destined for a legacy, ATM-only device; and switching said upside frame-based flow from said upside processing means to said downside processing means in accordance with said routing requirements as determined within said upside processing means.

4. The method of claim 3, wherein said method further comprising:

delivering said upside frame-based flow from said switch to said downside processing means as a downside frame-based flow; and identifying an output destination for said downside frame-based flow, wherein said output destination may be characterized as belonging to a group consisting of frame-based output destinations and ATM output destinations.

5. The method of claim 4, wherein said network processor further includes at least one ATM output port, and wherein said identifying is followed by segmenting said frame-base flow into an ATM output flow in response to identifying said output destination as an ATM output destination.

6. The method of claim 1, wherein said incoming flow is received by said upside processing means as an ATM flow, and wherein said determining further comprises determining whether said incoming flow is switched or terminated within said network processor.

7. The method of claim 6, wherein said method further includes in response to determining that said incoming flow is switched within said network processor, delivering said incoming flow to said switch in ATM format.

8. The method of claim 6, wherein said method further includes in response to determining that said incoming flow is terminated within said network processor, converting said incoming flow into a hybrid frame format;

delivering said converted incoming flow as an upside hybrid flow from said upside processing means to said switch;

delivering said upside hybrid flow from said switch to said downside processing means as a downside hybrid flow; and assembling said downside hybrid flow into an frame-based flow.

9. A method for integrating Asynchronous Transfer Mode (ATM) and frame-based traffic flows within a telecommunications network that includes a network processor having upside processing means for delivering an incoming flow from said telecommunications network to a switch, and wherein said network processor further comprises downside processing means for delivering outgoing network traffic from said switch to said telecommunications network, said method comprising the steps of:

receiving an incoming ATM flow by said upside processing means;

determining whether said incoming ATM flow is to be switched or terminated within said network processor;

in response to determining that said incoming ATM flow is to be switched within said network processor, delivering said incoming ATM flow across said switch to said downside processing means in ATM cell format; and in response to determining that said incoming ATM flow is to be terminated within said network processor, delivering said incoming ATM flow across said switch to said downside processing means as a partially assembled hybrid frame.

10. The method of claim 9, further comprising the steps of:

receiving an incoming frame flow by said upside processing means;

delivering said incoming frame flow across said switch in frame format to said downside processing means, such that said incoming frame flow is converted to a downside frame flow; and segmenting said downside frame flow into ATM cells in response to determining that said downside frame flow is to be delivered to an ATM destination.

11. A network processor for integrating Asynchronous Transfer Mode (ATM) and frame-based traffic flows within a telecommunications network, wherein said network processor includes upside processing means for delivering an incoming flow from said telecommunications network to a switch, and wherein said network processor further comprises downside processing means for delivering outgoing network traffic from said switch to said telecommunications network, said network processor comprising:

a data port for receiving and delivering an incoming ATM flow to said upside processing means;

processing means for determining whether said incoming ATM flow is to be switched or terminated within said network processor;

processing means responsive to determining that said incoming ATM flow is to be switched within said network processor, for delivering said incoming ATM flow across said switch to said downside processing means in ATM cell format; and processing means responsive to determining that said incoming ATM flow is to be terminated within said network processor, for delivering said incoming ATM flow across said switch to said downside processing means as a partially assembled hybrid frame.

12. The network processor of claim 11, further comprising:

a data port for receiving an incoming frame flow by said upside processing means;

processing means for delivering said incoming frame flow across said switch in frame format to said downside processing means, such that said incoming frame flow is converted to a downside frame flow; and processing means for segmenting said downside frame flow into ATM cells in response to determining that said downside frame flow is to be delivered to an ATM destination.

* * * * *